June 17, 1969 E. W. JENSEN 3,449,870

METHOD AND APPARATUS FOR MOUNTING THIN ELEMENTS

Filed Jan. 24, 1967

INVENTOR.
E. W. JENSEN
BY
Davis, Hoxie, Faithfull & Hapgood
ATTORNEYS.

United States Patent Office 3,449,870

Patented June 17, 1969

3,449,870
METHOD AND APPARATUS FOR MOUNTING THIN ELEMENTS

Elmer W. Jensen, Mount Vernon, N.Y., assignor to Geoscience Instruments Corporation, Mount Vernon, N.Y., a corporation of New York Continuation-in-part of application Ser. No. 561,951, June 30, 1966. This application Jan. 24, 1967, Ser. No. 622,381
Int. Cl. B24b *41/06, 5/00, 29/00*
U.S. Cl. 51—216 6 Claims

ABSTRACT OF THE DISCLOSURE

Thin wafer elements are mounted for processing by a porous membrane member secured to a mounting block, with a nonporous layer having a plurality of apertures therein being optionally fixed to the membrane.

The composite assembly is rotated in a liquid slurry environment to effect the desired wafer mounting.

*Disclosure of invention*

This application is a continuation-in-part of my patent application Ser. No. 561,951, filed June 30, 1966, now abandoned.

This invention relates to a method and apparatus for operating on relatively thin wafers, and, more specifically, for mounting the wafers for lapping, polishing, and similar processes.

Thin fragile elements, e.g., semiconductor wafers, have been refined to include a requisite highly polished critical surface by rotating the wafers under bearing contact with a fine grain cast iron lapping plate. The plate is preconditioned to be uniformly as flat as the surface to be reproduced on the wafers, i.e., typically flat to the order of a wave length of monocromatic light.

The wafers are fixed to a mounting block, and undergo planetary, rotary, or random motion under a controlled pressure while exposed to a slurry containing increasingly fine abrasive particles. Accordingly, the particles acting in conjunction with the lapping plate abrade the surface of the wafer blanks which eventually attain the extreme flatness of the iron plate. The wafers may then be polished by employing a slurry containing polishing grade abrasive particles.

The wafers to be lapped and polished, being extremely light and fragile, have typically been mounted on the circumference of the mounting block by wax, shellac cement, or low melting point metal alloys. This wax-type mounting requires that a small weight be placed on the top of the wafers to assure a continuous and firm contact between the block and wafers. The block, wafer and weight are heated and a drop of molten microcrystalline or other wax is placed at the edge of the wafers whereupon the wax seeps under the wafers and distributes itself between the elements to be secured and the mounting block. The composite system is then allowed to cool until the wax solidifies and hardens sufficiently to hold the wafers firmly in place. The excess is subsequently cleaned off by an appropriate solvent, and the lapping and polishing operations may then begin.

However, the above mode of operation is subject to several disadvantages. First, the wax mounting method is extremely time consuming since it may take up to an hour for the block and wafer system to heat and cool properly. Accordingly, the batch processing rate is correspondingly limited. Also, the wax and wax storing utensils must be kept free of all abrasive particles in view of the propensity of such particles to scratch the wafer surface during lapping or polishing operations.

Moreover, prior art systems have required constant reconditioning of the mounting block because the lapping and polishing slurries are both abrasive and corrosive, and thereby tend to throw the block out of flat, hence making it unsuitable for use as a wafer mounting substrate. In addition, the experience has been that the wafers are frequently damaged by the weights placed on them, even when the weights have been plastic coated. Still further, any excess wax at the edge of the wafers, or anywhere on the block, periodically catches relatively large abrasive particles from one lapping sequence, and transports them to a finer abrasive sequence where they scratch the wafer surface.

Perhaps the most serious objection to the wax-type mounting relates to the bowing observed when a firmly mounted semiconductor wafer is lapped and polished on one side only, either as an intermediate or final product.

The single face lapping of firmly mounted semiconductor wafers or crystals induces stresses internal to the subject material such that the wafers or crystals bow when released, and are thereby considered unsatisfactory for use. Generally speaking, the above objections manifest themselves by a breakage and rejection experience of up to 50% in the semiconductor processing art.

It is therefore an object of the present invention to provide an improved method and apparatus for mounting relatively thin wafers for lapping, polishing, and similar operations.

More specifically, an object of the present invention is the provision of a method and apparatus for mounting wafers in a manner such that minimal internal stresses are induced therein, and wherein the wafers do not come in contact with any hard mounting surfaces.

Another object of the present invention is the provision of a method and apparatus for mounting thin wafers which is significant less time consuming than prior art systems therefor.

A further object of the present invention is the provision of a method and apparatus for protecting mounting blocks from abrasive and corrosive attack from abrasive slurries by protecting them with a membrane and nonporous layer, thereby alleviating the requirement for periodically reconditioning such blocks.

These and other objects of the present invention are realized in a specific organization in which relatively thin wafers, e.g., semiconductor device layers on the order of .009 inch thick are mounted on a block via a membrane material exhibiting capillary properties. A nonporous layer, having a plurality of wafer accepting apertures and at least one additional aperture for permitting a liquid flow therethrough is placed over the membrane.

The composite structure is rotated rapidly in a liquid slurry environment. The wafers are held firmly in place for processing by the liquid flowing radially outward through the capillary membrane adjacent to the wafers.

It is therefore a feature of the present invention that a method for mounting wafers for lapping type operations includes placing the wafers on a mounting block having affixed thereto a membrane exhibiting capillary properties, directing a liquid to the wafers and membrane, and rotating the composite mounting assembly.

It is another feature of the present invention that a method for mounting relatively thin wafers for lapping, polishing, and similar operations includes placing the wafers on a mounting block having affixed thereto a membrane characterized by capillary properties and also a nonporous layer having a plurality of apertures therein, directing a slurry to the wafers, nonporous layer and the membrane, and rotating the composite mounting assembly.

A further feature of the present invention is that an organization for fixing a relatively thin wafer in place for processing includes a mounting block having a flat surface thereon, a membrane characterized by capillary properties mounted on the flat surface, and a nonporous layer having a plurality of apertures therein affixed to the membrane.

A complete understanding of the present invention and of the above and other features and advantages thereof may be gained from a consideration of an illustrative embodiment thereof presented hereinbelow in conjunction in the accompanying drawing, in which.

Figure 1:
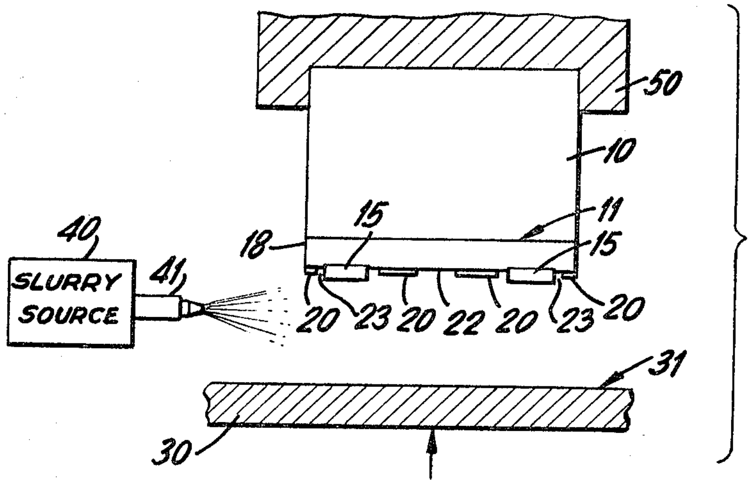
FIG. 1 is a cross-sectional diagram depicting a wafer mounting organization which illustratively embodies the principles of the present invention.

Referring now to FIG. 1, there is shown in cross-sectional form a semiconductor wafer mounting organization made in accordance with the principles of the present invention. The arrangement comprises a corrosion resistant circular metallic mounting block 10 having a flap lap surface 11. A membrane 18 is adhered to the surface 11 via an adhesive (not shown in the drawing), with the membrane material being adapted to exhibit capillary properties. The membrane 18 may preferably comprise Corfam (a trademark of the Du Pont Corporation for a poromeric material, i.e., a microporous and permeable coriaceous non-woven sheet comprising a urethane polymer base reinforced with polyester). Alternatively, the membrane 18 may comprise a chamois material, other poromeric materials, or soft porous substances characterized by a fine cellular microstructure.

Figure 2:
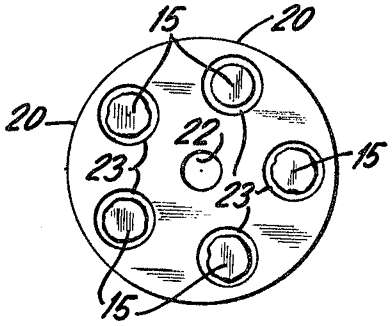
FIG. 2 is a bottom view of the mounting assembly illustrated in FIG. 1.

According to one aspect of the present invention, the composite mounting assembly also includes a nonporous layer 20 which may illustratively comprise a Mylar (a trademark of the Du Pont Corporation for films of polyethylene tetraphthalate) material. The layer 20 is adhered to the membrane 18 and includes a plurality of semiconductor wafer blank receiving apertures 23 and, in general, at least one liquid receiving aperture 22 therein. A bottom view of the wafer mounting assembly of FIG. 1 is illustrated in FIG. 2, wherein semiconductor wafers 15 of an arbitrary shape are shown as inserted in the significantly larger apertures 23 in the Mylar layer 20.

In the practice of the invention, the membrane 18 is first wet with water containing any well-known additive to reduce the water surface tension. The wafers 15 are then placed in the Mylar apertures 23 and an absorbent element, e.g., a paper towel, is brought into pressure contact with the face of the wafer holding assembly, thereby causing the wafers 15 to temporarily seat themselves in the relatively soft membrane 18. The mounting block 10 is then affixed to an assembly 50 (FIG. 1) or the like which is adapted to rotate the block 10 and the associated elements at a relatively rapid rate.

Coincidentally therewith a lapping or polishing plate 30, including a flat lapping or polishing surface 31, is brought into rotational contact with the wafers 15 in the presence of an abrasive slurry supplied by a source 40 thereof via a nozzle 41.

Figure 3:
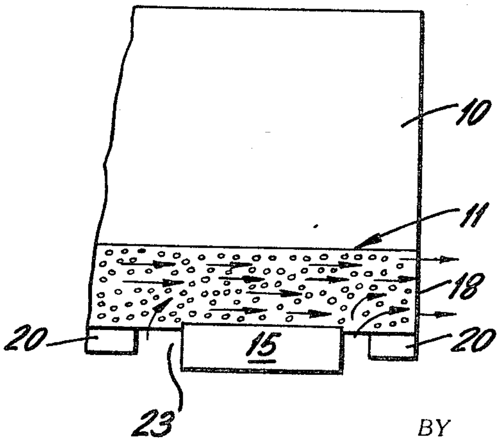
FIG. 3 is a partial cross-sectional diagram of the wafer mounting apparatus of FIG. 1 employed to illustrate the theoretical aspects of the FIG. 1 arrangement.

Operating in the above manner, the semiconductor wafers 15 have been found to adhere tightly to the membrane 18 against the force of gravity, and to remain fixed through successive lapping and polishing operations. The physical mechanism which causes this adhesion, however, is uncertain. By way of further description and without limitation to any aspect of the present invention, it is theorized from experimental evidence that the adhesion is principally caused by localized low pressure areas, or vacuums, created in the portion of the membrane 18 immediately adjacent to the wafers 15. More specifically, with reference to FIG. 3, it is observed that liquid from the slurry (indicated by the vectors in the drawing) vertically enters the spinning membrane 18 assembly by capillary action through the area within the Mylar apertures 23 surrounding the wafers 15, and also via the aperture 22. Because the membrane 18 is rotating rapidly, centrifugal force constrains the liquid entering the membrane to pass horizontally above the wafers 15 with the liquid being ejected from the outside edge thereof. This liquid flow above the wafers 15 is believed to create localized vacuums above the elements 15 holding them in place. Again it is emphasized that the above theoretical discussion is presented by way of explanation and not limitation.

Several observations are made at this point. First, where the temporary wafer 15 positioning operation effected by the Mylar layer 20 is not required, i.e., in the case of relatively large wafer blanks, the layer 20 may be deleted. More specifically, as wafers 15 characterized by significant mass are being processed, the membrane wetting operation may alone be employed to temporarily position the wafers 15 until the principal above-described holding mechanism comes into play when the membrane is rotated in the liquid environment. In particular, the slurry in such an arrangement enters the membrane 18 through the entire membrane surface surrounding the wafers 15, and is horizontally expelled by centrifugal action as set forth above.

In addition, it is noted that the method and apparatus of the present invention avoids the rigid, totally immobile interface between the subject wafer 15 and the metallic mounting block 10 which characterized prior art processing systems. Accordingly, since the wafers 15 can locally compress the membrane 18 of FIG. 1, the undesired internal stress previously induced in the wafers is largely obviated. Furthermore, badly tapered wafers and crystals may be lapped selectively on each side along a plane parallel to the wedge center line, hence producing a usable end product. Prior art lapping systems have been forced to discard such wedge-shaped semiconductor blanks.

It is to be understood that the above-described method and organization is only illustrative of the application of the principles of the present invention. Numerous other arrangements and modes of operations may be devised by those skilled in the art without departing from the spirit and scope of the invention.

I claim:

1. A method for mounting a workpiece wafer for processing and for retaining said wafer in place during processing including the steps of placing the wafer on a synthetic microporous membrane, said membrane being adhered to a mounting block, temporarily holding said wafer in place, and developing a force for adhering said wafer to said membrane for processing, said force developing step comprising directing a first liquid onto said membrane and rapidly rotating said block and membrane to cause said first liquid to continuously pass through said membrane in proximity to said wafer.

2. A method as in claim 1 further comprising the steps of wetting said membrane with a second liquid characterized by a low surface tension before placing the wafer thereon, and forcing second liquid absorbing means against said membrane and wafer after said wafer is inserted in place and before said block, membrane and wafer are rotated.

3. A method as in claim 1, wherein said first liquid is a slurry having abrasive particles therein, and further comprising the step of bearing the flat surface of an abrasive carrying plate against said wafer.

4. A method as in claim 1 wherein a nonporous layer having at least one wafer receiving aperture is disposed over said synthetic microporous membrane, and wherein said wafer is placed on said membrane in said aperture in said nonporous sheet.

5. In combination in apparatus for retaining workpiece wafers in place during processing, a mounting block, a continuous microporous membrane attached to said block for receiving said wafers, a nonporous layer having a plurality of apertures larger than said wafers affixed to said membrane, means for supplying a fluid to said membrane, and means for rapidly rotating said block to cause said fluid to pass through said membrane in proximity to said wafers.

6. A combination as in claim 5 wherein said microporous membrane comprises a poromeric material.

References Cited

UNITED STATES PATENTS

| | | | |
|---|---|---|---|
| 2,112,636 | 3/1938 | Sawyer. | |
| 2,699,633 | 1/1955 | Lapenas | 51—283 X |
| 2,998,680 | 9/1961 | Lipkins | 51—131 |
| 3,123,953 | 3/1964 | Merkl | 51—283 |
| 3,166,875 | 1/1965 | Litman | 51—216 |

HAROLD D. WHITEHEAD, *Primary Examiner.*

U.S. Cl. X.R.

51—131, 236, 283